United States Patent
Eberbach

(10) Patent No.: US 9,697,194 B2
(45) Date of Patent: Jul. 4, 2017

(54) CONTEXTUAL AUTO-CORRECT DICTIONARY

(71) Applicant: International Business Machines Corporation, Armonk, NY (US)

(72) Inventor: Adam H.E. Eberbach, Surrey Hills (AU)

(73) Assignee: International Business Machines Corporation, Armonk, NY (US)

(*) Notice: Subject to any disclaimer, the term of this patent is extended or adjusted under 35 U.S.C. 154(b) by 42 days.

(21) Appl. No.: 14/732,956

(22) Filed: Jun. 8, 2015

(65) Prior Publication Data

US 2016/0357730 A1    Dec. 8, 2016

(51) Int. Cl.
*G06F 17/20* (2006.01)
*G06F 17/21* (2006.01)
*G06F 17/27* (2006.01)

(52) U.S. Cl.
CPC ........ *G06F 17/2735* (2013.01); *G06F 17/273* (2013.01); *G06F 17/276* (2013.01)

(58) Field of Classification Search
None
See application file for complete search history.

(56) References Cited

U.S. PATENT DOCUMENTS

| | | | | |
|---|---|---|---|---|
| 5,682,543 | A * | 10/1997 | Shiomi | G06F 17/2795 715/246 |
| 6,883,035 | B2 * | 4/2005 | Hannu | H03M 7/3088 709/217 |
| 8,719,014 | B2 * | 5/2014 | Wagner | G06F 17/273 704/1 |
| 8,881,005 | B2 | 11/2014 | Al Badrashiny et al. | |
| 9,075,783 | B2 * | 7/2015 | Wagner | G06F 17/273 |
| 9,292,621 | B1 * | 3/2016 | Roth | G06F 17/3097 |
| 2004/0133417 | A1 * | 7/2004 | Azuma | G06F 17/2872 704/8 |
| 2009/0187401 | A1 * | 7/2009 | Vuong | G06F 3/0237 704/10 |
| 2012/0239399 | A1 * | 9/2012 | Yamazaki | G10L 15/22 704/243 |
| 2014/0040773 | A1 * | 2/2014 | Sanghavi | G06F 17/273 715/753 |
| 2014/0067371 | A1 | 3/2014 | Liensberger | |
| 2014/0267045 | A1 | 9/2014 | Grieves et al. | |
| 2014/0281944 | A1 * | 9/2014 | Winer | G06F 17/2735 715/259 |
| 2015/0046804 | A1 * | 2/2015 | Weksler | G06F 17/211 715/257 |

(Continued)

FOREIGN PATENT DOCUMENTS

WO    2014035773 A1    3/2014

OTHER PUBLICATIONS

"Damn You Auto Correct!"; Defy Media; Copyright © 2008, provided in the main idea on Mar. 7, 2015, pp. 1-5; <http://www.damnyouautocorrect.com/>.

*Primary Examiner* — Satwant Singh
(74) *Attorney, Agent, or Firm* — Aaron N. Pontikos

(57) ABSTRACT

A processor generates a temporary dictionary of one or both words and phrases based on an access of a first application. The processor uses the temporary dictionary to carry out auto-correct operations on text included in a second application.

14 Claims, 3 Drawing Sheets

(56) References Cited

U.S. PATENT DOCUMENTS

2015/0331606 A1* 11/2015 Shen .................. G06F 3/0237
 715/773
2016/0103813 A1* 4/2016 Liensberger ............ G06F 17/24
 715/259

* cited by examiner

CONTEXTUAL AUTO-CORRECT DICTIONARY

BACKGROUND OF THE INVENTION

The present invention relates generally to the field of dictionaries, and more particularly to autocorrect dictionaries.

Computing devices, such as mobile phones, portable and tablet computers, entertainment devices, handheld navigation devices, and the like are commonly implemented with on-screen keyboards (e.g., soft keyboards) that may be employed for text input and/or other interaction with the computing devices. When a user inputs text characters into a text box or otherwise inputs text using an on-screen keyboard or similar input device, a computing device may apply auto-correction to automatically correct misspellings and/or text prediction to predict and offer candidate words/phrases based on input characters.

Auto-correction is a function that is implemented in some text handling tools to automatically correct spelling and/or typing errors in text. Auto-correction may also be used to automatically format text or insert special characters by recognizing particular character usage, saving the user from having to manually perform the formatting/character inserting. Tools on mobile devices that are used to send text messages (e.g., Short Message Service (SMS) messages, etc.) may implement auto-correction, as well as other types of messaging tools. Auto-correction may also be referred to as "autocorrect," "replace as you type," and "text replacement," among other names.

SUMMARY

Embodiments of the present invention provide a method, a computer system, and a computer program product to generating an auto-correct dictionary. A processor generates a temporary dictionary of one or both words and phrases based, at least in part, on an access of a first application. The processor uses the temporary dictionary to carry out auto-correct operations on text included in a second application.

DETAILED DESCRIPTION

Figure 1:
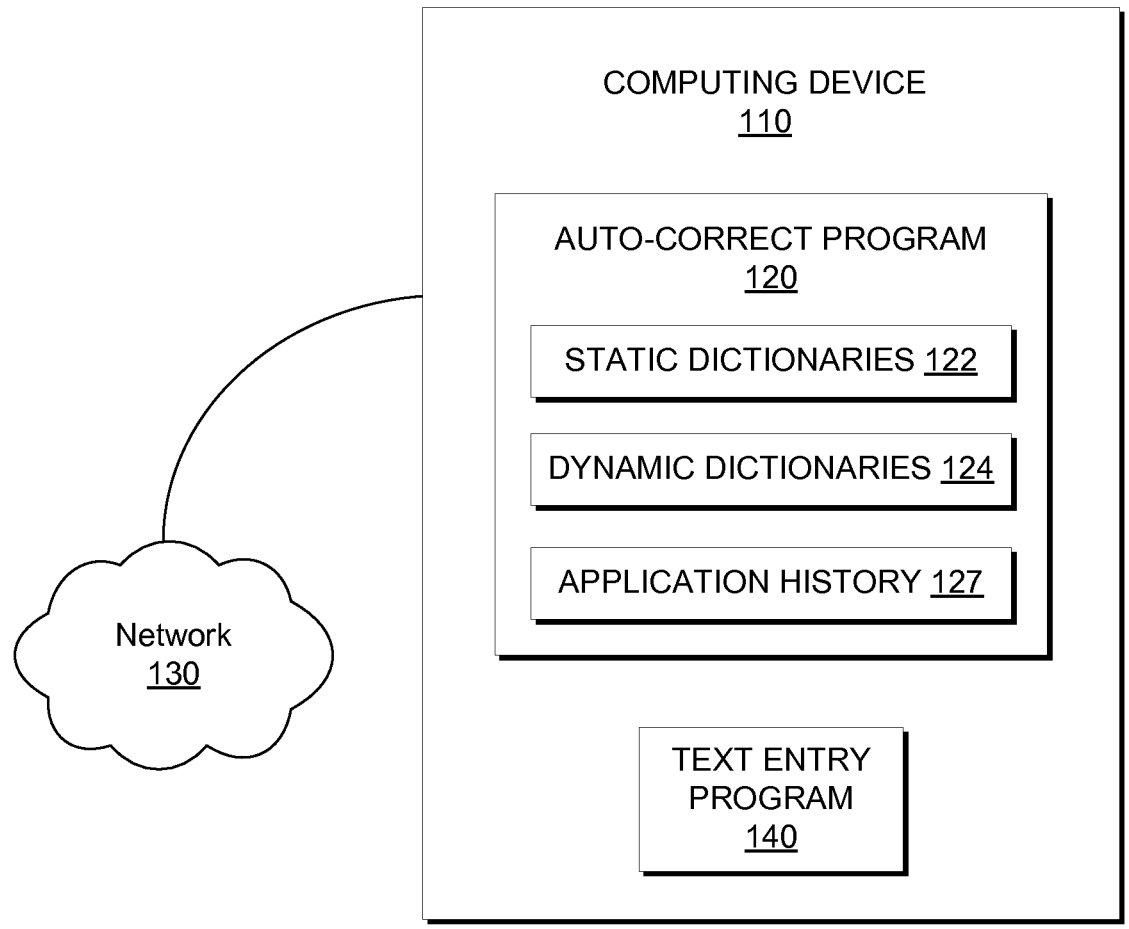
FIG. 1 is a functional block diagram illustrating a text creation environment, in accordance with an exemplary embodiment of the present invention.

Two common methods for error detection are a rule based method and a dictionary based method. The rule based method depends on morphological analyzers to check whether the word is following language morphological rules or not. The dictionary based method depends on a large, balanced and revised training corpus to generate a dictionary which covers the most frequently used words in the target language. The rule based method may, in some cases, have better coverage of possible words, but the morphological analyses process often adversely affects system performance and cannot manage transliterated words.

While solutions to auto-correct text are known such auto-correction tools are typically configured to auto-correct text using a premade dictionary. In some known approaches, auto-corrections and text predictions are produced using static language models that may be developed in testing simulations and hard-coded on a device. In some solutions, users may be able to explicitly add a word to the model or omit a word, but otherwise the static language model may not adapt to particular users and interaction scenarios. Accordingly, text prediction candidates provided using traditional techniques are often inappropriate or irrelevant for the user and/or scenario, which may lead to frustration and lack of faith in the predictions.

In addition, devices are used that may receive text in more than one language. In such a circumstance, an auto-correction tool that may not work as desired. For instance, a Spanish speaking user may type in the word "yo," which, in Spanish, means "I". However, if the auto-correction tool is configured for the English language, and as such the auto-correction tool may undesirably autocorrect the word "yo" to the word "you" or to another English word. Such undesired auto-corrections of text may be inconvenient to a user. If the user notices that a word was auto-corrected that should not have been, the user may manually convert the text back to its original, uncorrected form. However, if the user does not notice the undesired auto-correction, the meaning of the text that the user was providing may undesirably be changed, or the text may even become unintelligible.

Text enhancement systems are used in the area of human language technology (HLT) where manual correction of text is time consuming and creates a bottleneck in HLT applications. Systems in HLT, e.g., document understanding systems and speech recognition systems, depend on reliable automatic misspelling correction capabilities. Although spell checkers are widely available for a number of languages, most spell checkers only detect errors and propose corrections regardless of their context, which increases ambiguity and incorrect suggestions for misspelled words. Also, some available systems are not able to detect and correct all kinds of errors, in addition to having other constraints.

Embodiments of the present invention recognize that a given dictionary based autocorrect solution determines whether a word is correct or incorrect based on its references, which are a set of dictionaries (lists of known words and phrases). Some dictionaries are provided with the operating system and are chosen based on context, i.e. system language, location, time or other factors. Another dictionary may be created following user input of an unknown word following confirmation that the word or phrase is correct and should be recognized as such in future.

Embodiments of the present invention recognize that one problem with certain dictionary based autocorrect solutions is that correct words or phrases that are entered by users are flagged as incorrect because they are not contained in existing dictionaries. Examples can include names originating in other languages, trademarks, and domain names, etc. For example, a user using a word or phrase in a new message, for example "check out this kickstarter I saw on imgur" might have "kickstarter" corrected to "kickstarted" and "imgur" to "infuriating". To a user such auto-corrections may be undesired since they had entered the word correctly. For example, the user may have just looked at such a word in another application. Correction by autocorrect in this case can make the user appear careless at best, can make a message entirely meaningless or can result in embarrassing changes to meaning.

As such, embodiments of the present invention provide user input referring to words and phrases, which are initially unknown to the autocorrect dictionaries, but are automatically identified based on application context. Embodiments of the present invention provide for the creation of dynamic dictionaries based, at least in part, on a history of application usage, i.e., a record of application usage. Embodiments of the present invention provide for the temporarily addition of words or phrases to auto-correct dictionaries, enabling a user to enter text without spurious auto-correction.

The present invention will now be described in detail with reference to the Figures.

FIG. 1 is a functional block diagram illustrating a text creation environment, generally designated 100, in accordance with one embodiment of the present invention. Text creation environment 100 includes computing device 110 connected over network 130. Computing device 110 includes auto-correct program 120 and text entry program 140. Auto-correct program 120 includes static dictionaries 122, dynamic dictionaries 124, and application history 127.

In various embodiments of the present invention, computing device 110 is a computing device that can be one of a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to and is capable of executing auto-correct program 120 and text entry program 140. Computing device 110 may include internal and external hardware components, as depicted and described in further detail with respect to FIG. 3.

In this exemplary embodiment, one or more of auto-correct program 120, static dictionaries 122, dynamic dictionaries 124, application history 127, and text entry program 140 are stored on computing device 110. However, in other embodiments, one or more of auto-correct program 120, static dictionaries 122, dynamic dictionaries 124, application history 127, and text entry program 140 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, auto-correct program 120, static dictionaries 122, dynamic dictionaries 124, application history 127, and text entry program 140, in accordance with a desired embodiment of the present invention.

In one embodiment of the present invention, auto-correct program 120 requests a textual context from an application. In general, the textual context is a list of words appearing or having appeared recently or have been entered into various fields of applications. In some instances, such textual context includes details regarding the applications themselves, for example, the names of those applications. Generally, when autocorrect activity is requested or commences (typically following user entry of text into a foreground application), auto-correct program 120 uses the textual context of previously accesses applications to create a temporary dictionary, for example, dynamic dictionaries 124. As such, dynamic dictionaries 124 are created on an "as-needed" basis.

In one embodiment, dynamic dictionaries 124 is generated based, at least in part, on a history of application usage that is obtained from application history 127. Application history 127 includes a log of applications that were recently accessed by a user. In one embodiment, currently running applications are included in application history 127. In another embodiment, application history 127 includes a list of recently accessed applications, for example, the last ten applications that were accessed or the applications that were accessed in the last three days. In general, auto-correct program 120 determines whether or not an entry in application history 127 is to be considered as recent based on a set of rules. Such rules are typically modifiable based on a users preference and as such, many variations are possible. One skilled in the art would recognize that many such rules can be created and modified by one or both of a user and a software developer. As such, dynamic dictionaries 124 is generated based on which information is selected using such rules. In some embodiments, such rules specify certain applications and/or types of accessed and entered content that are to be ignored when creating entries for application history 127. For example, a user may specify that accessed and entered content associated with a web-browser be ignored when creating entries for application history 127. Such a rule can reduce a number of words or phrase that would otherwise be included as part of application history 127.

In some embodiments, applications include a plugin that updates application history 127 with their information. In some embodiments, application history 127 includes a list of applications that are each associated with a list of words that do not appear in static dictionaries 122 but are: i) included in either information regarding that application, or ii) were entered into a field of that application by a user. For example, a user creates an email using application "A". Application A includes a plugin for updating application history 127. As such, as a user enters text into the fields of the email, application "A" compares the contents to static dictionaries 122 to identify words that are not included in static dictionaries 122. Application "A" then updates application history 127 with the name of application "A", a time when application "A" was accessed, and any words that were not found in static dictionaries 122 but were included in the email. In some embodiments, auto-correct program 120 includes the functionality of the plugin included in application "A". Therefore, in such embodiments, auto-correct program 120 includes functionality to monitor applications, such as text entry program 140, and creates entries that are included in application history 127.

In one embodiment of the present invention, auto-correct program 120 accesses application history 127 and identifies applications have been recently accessed, e.g., accessed within a predetermined or preset time frame, or a preset number of applications that were last accessed. Auto-correct program 120 then accesses the lists of words that are associates with each of those applications and combines them to form dynamic dictionaries 124. In general, dynamic dictionaries 124 is generated such that repeated entries of words that are retrieved from application history 127 are included only once in dynamic dictionaries 124. As such, dynamic dictionaries 124 is herein seen to include a list of words that were not included in static dictionaries 122 but were entered by a user into a recently accessed application or describe that application, e.g., a name, or type of the application.

In one embodiment, auto-correct program 120 uses both static dictionaries 122 and dynamic dictionaries 124 for auto-correct operations. In other words, when auto-correct functions are being applied to a given entered segment of text, any entered word or phrase matching a word or phrase in either static dictionaries 122 or dynamic dictionaries 124 is treated as valid.

In some embodiments, the contents of dynamic dictionaries 124 also reflects the contents of accessed information. For example, in one embodiment and scenario, a user accesses a website using web-browser "B". Auto-correct program 120 analyses the contents of the website, which is a technical forum, and identifies thirty terms and phrases that are not included in static dictionaries 122. Auto-correct program 120 updates dynamic dictionaries 124 to reflect that web-browser "B" was used at that time and date, as well as to reflect the thirty terms and phrases that are not included in static dictionaries 122. Therefore, when the user composes an email later on, the thirty terms and phrases are included as part of dynamic dictionaries 124 and therefore are treated as valid.

In one embodiment of the present invention, static dictionaries 122, is a general word dictionary. Static dictionaries 122 includes a list of common words and phrases based one or more languages or other forms of communication. In general, a user selects their preferred language during a setup operation and the contents of static dictionaries 122 is populated based on those selections. The content of static dictionaries 122 is substantially static insofar as the content of static dictionaries 122 do not change without user input to do so. For example, a user can request that a given word or phrase be added to static dictionaries 122. In another example, a user adds another language as part of their language preferences and static dictionaries 122 is updated to reflect that user selection.

In one embodiment of the present invention, is any program where text can be entered. As text is entered into one or more fields included in text entry program 140, auto-correct program 120 uses both static dictionaries 122 and dynamic dictionaries 124 for auto-correct operations on the entered text.

Figure 2:
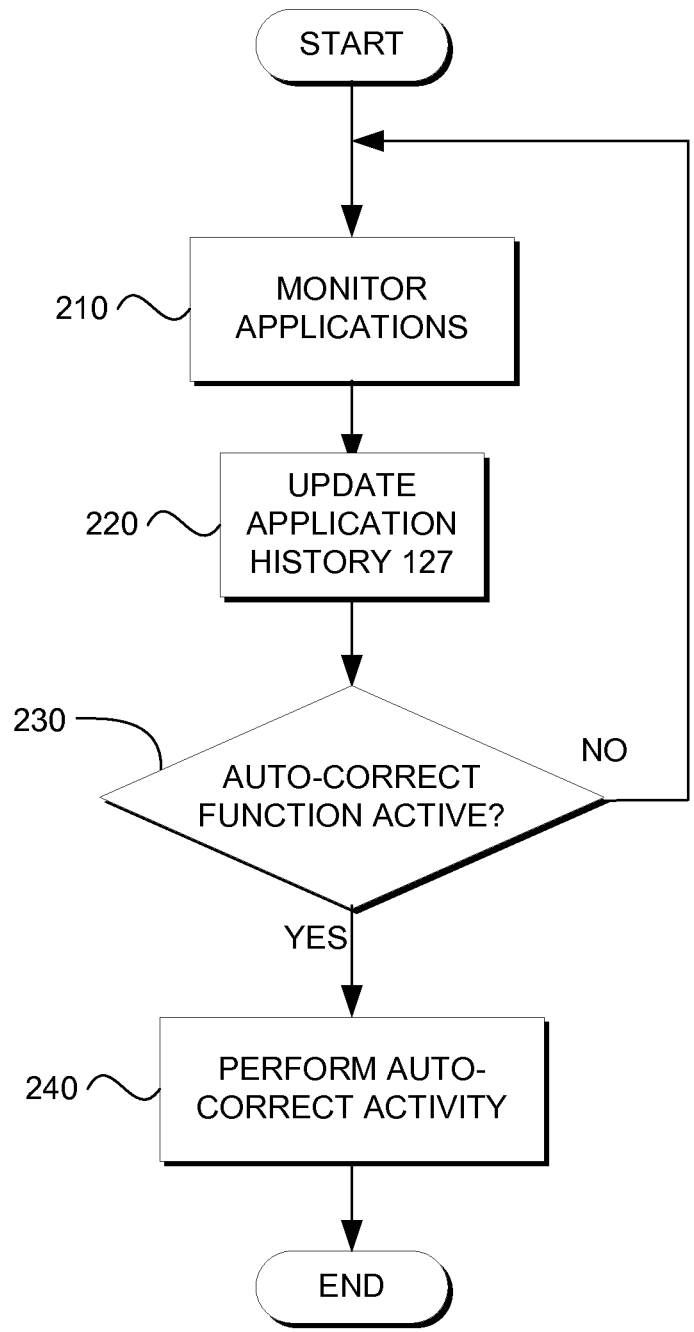
FIG. 2 illustrates operational processes of an auto-correct program, executing on a computing device within the environment of FIG. 1, in accordance with an exemplary embodiment of the present invention.

FIG. 2 illustrates operational processes of auto-correct program 120, executing on a computing device within the environment of FIG. 1, in accordance with an exemplary embodiment of the present invention.

In process 210, auto-correct program 120 monitors applications being accessed on computing device 110.

In process 220, auto-correct program 120 updates application history 127 based on the information gather via the monitoring. As such, application history 127 reflects which applications were accessed, as well as the words and phrases of entered or accessed information that were not included in static dictionaries 122. As such, the contents of application history 127 indicate one or both of words and phrases that were not included in the dictionaries of static dictionaries 122.

In determination process 230, auto-correct program 120 determines whether auto correct function has been activated. If auto-correct program 120 determines that auto-correct function has been activated, then auto-correct program 120 accesses the information included in application history 127 and generates dynamic dictionaries 124. If auto-correct program 120 determines that auto-correct function has not been activated, then auto-correct program 120 returns to monitoring activity of applications (process 210).

In process 240, auto-correct program 120 performs auto-correct activity. Auto-correct program 120 uses both static dictionaries 122 and dynamic dictionaries 124 to perform the auto-correct processes on text entered into one or more fields included in text entry program 140. In other words, auto-correct program 120 uses both static dictionaries 122 and dynamic dictionaries 124 to carry out auto-correct operations on text included in other applications.

In one embodiment, the generation of dictionaries by auto-correct program 120 continues for as long as auto-correct program 120 is active such that a dictionary, included in dynamic dictionaries 124, is ready for use in an auto-correct operation at any time. In one embodiment, dynamic dictionaries 124 is updated periodically by auto-correct program 120 to reflect changes in the records of recently accessed applications included in application history 127. In one embodiment, a dictionary included in dynamic dictionaries 124 is updated by deleting the contents of dynamic dictionaries 124 and replacing the deleted contents with updated information from application history 127. In one embodiment, a new dictionary is generated periodically by auto-correct program 120 for as long as auto-correct program 120 is active such that a dictionary included in dynamic dictionaries 124 not only reflects changes in the records of recently accessed applications included in application history 127 but is also ready for use in an auto-correct operation at any time. In one embodiment, auto-correct program 120 is configured to respond to a determination that the temporary dictionary is not to be used to carry out auto-correct operations by deleting the contents of the temporary dictionary of dynamic dictionaries 124.

Figure 3:
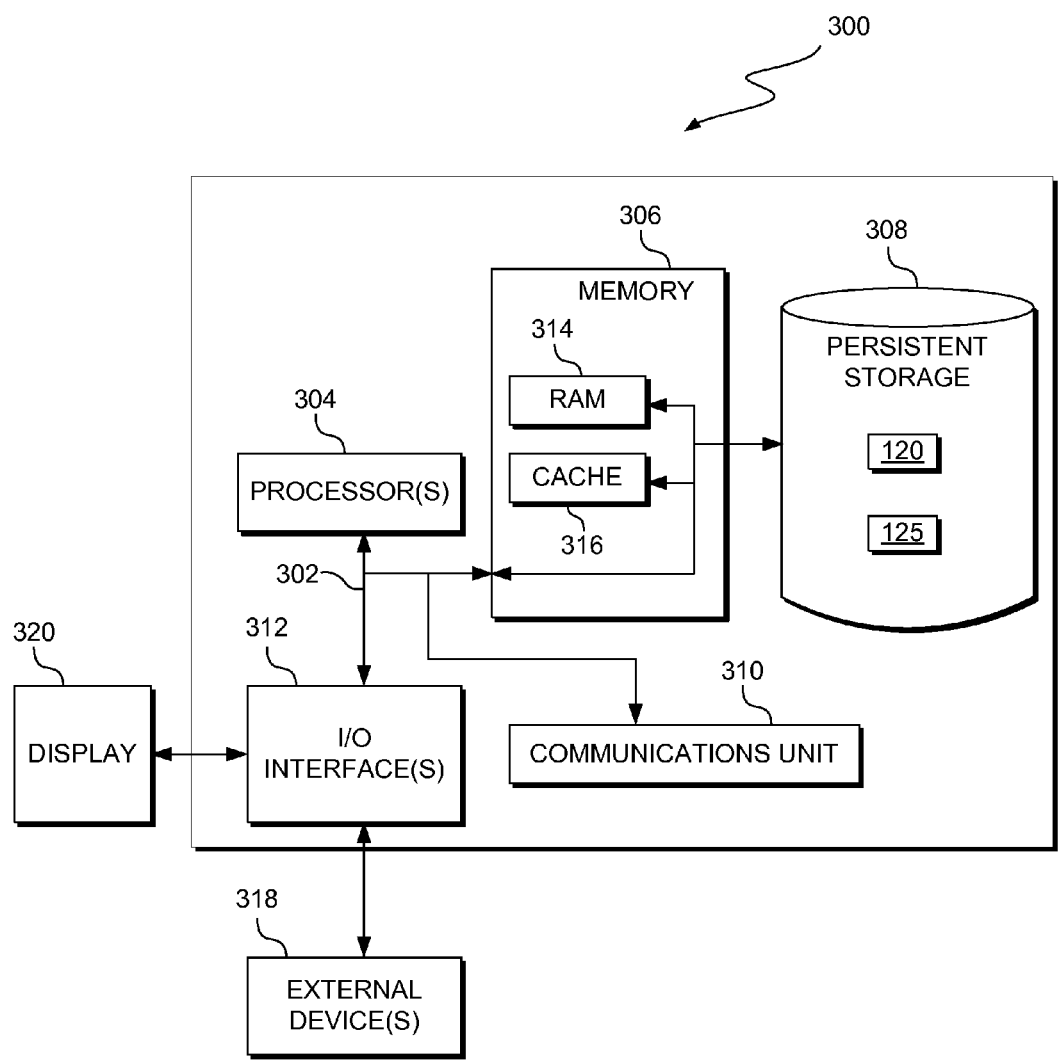
FIG. 3 depicts a block diagram of components of the computing device executing the auto-correct program, in accordance with an exemplary embodiment of the present invention.

FIG. 3 depicts a block diagram, 300, of components of computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Auto-correct program 120, static dictionaries 122, dynamic dictionaries 124, application history 127, and text entry program 140 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. One or more of auto-correct program 120, static dictionaries 122, dynamic dictionaries 124, application history 127, and text entry program 140 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., one or more of auto-correct program 120, static dictionaries 122, dynamic dictionaries 124, application history 127, and text entry program 140, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method of generating an auto-correct dictionary, the method comprising:
    analyzing, by a processor, contents of information accessed by a user via a first application, wherein:
        the contents of information include at least one of words and phrases that appear in the first application;
    identifying, by the processor, at least one of the words and the phrases that appear in the first application and are not included in a first dictionary;
    generating, by the processor, a temporary dictionary based, at least in part, on at least one of the words and the phrases identified in the first application that are not included in the first dictionary; and
    using, by the processor, the temporary dictionary to carry out auto-correct operations on text included in a second application.

2. The method of claim 1, the method further comprising:
    generating, by the processor, a record for the first application that indicates one or both of words and phrases that were not included in the first dictionary.

3. The method of claim 1, wherein the access of the first application occurred within a predetermined time frame.

4. The method of claim 1, wherein the temporary dictionary includes at least one of:
    one or both words and phrases that were entered into a field of the first application;
    one or both words and phrases that were included in the contents of information that appeared in the first application; and
    one or both words and phrases that are included as part of a description of the first application.

5. The method of claim 1, the method further comprising:
    responsive to a determination that the temporary dictionary is not to be used to carry out auto-correct operations, deleting, by the processor, the contents of the temporary dictionary.

6. A computer program product for generating an auto-correct dictionary, the computer program product comprising:
    one or more computer-readable storage media and program instructions stored on the one or more computer-readable storage media, the program instructions comprising:
        program instructions to analyze contents of information accessed by a user via a first application, wherein:
            the contents of information include at least one of words and phrases that appear in the first application;
        program instructions to identify at least one of the words and the phrases that appear in the first application and are not included in a first dictionary;
        program instructions to generate a temporary dictionary based, at least in part, on at least one of the words and the phrases identified in the first application that are not included in the first dictionary; and
        program instructions to use the temporary dictionary to carry out auto-correct operations on text included in a second application.

7. The computer program product of claim 6, the program instructions further comprising:
    program instructions to generate a record for the first application that indicates one or both of words and phrases that were not included in the first dictionary.

8. The computer program product of claim 6, wherein:
    the access of the first application occurred within a predetermined time frame.

9. The computer program product of claim 6, wherein the temporary dictionary includes at least one of:
    one or both words and phrases that were entered into a field of the first application;
    one or both words and phrases that were included in the contents of information that appeared in the first application; and
    one or both words and phrases that are included as part of a description of the first application.

10. The computer program product of claim 6, the program instructions further comprising:
    program instructions to respond to a determination that the temporary dictionary is not to be used to carry out auto-correct operations by deleting the contents of the temporary dictionary.

11. A computer system for generating an auto-correct dictionary, the computer system comprising:
    one or more computer processors;
    one or more computer readable storage medium;

program instructions stored on the computer readable storage medium for execution by at least one of the one or more processors, the program instructions comprising:
- program instructions to analyze contents of information accessed by a user via a first application, wherein:
  - the contents of information include at least one of words and phrases that appear in the first application;
- program instructions to identify at least one of the words and the phrases that appear in the first application and are not included in a first dictionary;
- program instructions to generate a temporary dictionary based, at least in part, on at least one of the words and the phrases identified in the first application that are not included in the first dictionary; and
- program instructions to use the temporary dictionary to carry out auto-correct operations on text included in a second application.

12. The computer system of claim 11, the program instructions further comprising:
- program instructions to generate a record for the first application that indicates one or both of words and phrases that were not included in the first dictionary.

13. The computer system of claim 11, wherein:
the access of the first application occurred within a predetermined time frame.

14. The computer system of claim 11, wherein the temporary dictionary of one or both words and phrases includes at least one of:
- one or both words and phrases that were entered into a field of the first application;
- one or both words and phrases that were included in the contents of information that appeared in the first application; and
- one or both words and phrases that are included as part of a description of the first application.

* * * * *